US 9,162,633 B2

(12) United States Patent
Takezawa et al.

(10) Patent No.: US 9,162,633 B2
(45) Date of Patent: Oct. 20, 2015

(54) DECORATION PART (71) Applicant: TOYOTA BOSHOKU KABUSHIKI KAISHA, Aichi-ken (JP)

(72) Inventors: Masanori Takezawa, Toyokawa (JP); Takayoshi Nakagawa, Okazaki (JP); Tomonori Ishikawa, Toyoake (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/536,932

(22) Filed: Nov. 10, 2014

(65) Prior Publication Data

US 2015/0130204 A1 May 14, 2015

(30) Foreign Application Priority Data

Nov. 13, 2013 (JP) .................................. 2013-234770

(51) Int. Cl.
*B60J 9/00* (2006.01)
*B60R 13/02* (2006.01)

(52) U.S. Cl.
CPC ......... *B60R 13/0243* (2013.01); *B60R 13/0206* (2013.01)

(58) Field of Classification Search
CPC ........ A01B 35/20; A01B 43/00; A01B 49/62; B67D 9/02; E01C 11/126; H01L 2924/00; H05K 13/0417; C07C 5/2775; F16D 31/02; F16D 31/08
USPC ...................................................... 296/1.08
See application file for complete search history.

(56) References Cited

U.S. PATENT DOCUMENTS

| | | | | |
|---|---|---|---|---|
| 5,181,759 | A * | 1/1993 | Doolittle | 296/153 |
| 5,462,786 | A * | 10/1995 | Van Ert | 428/171 |
| 5,951,094 | A * | 9/1999 | Konishi et al. | 296/153 |
| 6,213,538 | B1 * | 4/2001 | Scheidmantel et al. | 296/153 |
| 6,447,047 | B1 * | 9/2002 | Marcovecchio et al. | 296/146.7 |
| 6,821,465 | B1 * | 11/2004 | Stein et al. | 264/83 |
| 6,991,841 | B2 * | 1/2006 | Cowelchuk et al. | 428/71 |
| 7,108,312 | B2 * | 9/2006 | Cowelchuk et al. | 296/146.7 |
| 7,332,207 | B2 * | 2/2008 | Bondar et al. | 428/71 |
| 7,367,103 | B2 * | 5/2008 | Schoemann et al. | 29/527.1 |
| 7,644,969 | B2 * | 1/2010 | Foster et al. | 296/1.08 |
| 7,963,586 | B2 * | 6/2011 | Muller et al. | 296/146.7 |
| 8,011,717 | B2 * | 9/2011 | Endo et al. | 296/187.05 |
| 8,562,064 | B2 * | 10/2013 | Yamaguchi et al. | 296/146.7 |
| 8,585,123 | B2 * | 11/2013 | Itou et al. | 296/146.7 |
| 8,915,001 | B2 * | 12/2014 | Breunig et al. | 40/546 |

(Continued)

FOREIGN PATENT DOCUMENTS

JP  2005-053435  3/2005

*Primary Examiner* — Kiran B Patel
(74) *Attorney, Agent, or Firm* — Greenblum & Bernstein, P.L.C.

(57) ABSTRACT

A decoration part includes a base member having a front-side surface and an outer peripheral end portion, a skin covering the front-side surface of the base member, and a holding member mounted to the front-side surface of the base member and arranged on a rear-surface side of the skin. The skin has a stitch line formed with a thread, and a part of the stitch line is arranged in the outer peripheral end portion. The holding member holds the thread with which the skin and the holding member are sewed and has a linear shape extending along the stitch line. The holding member has a mount portion mounted to a holding member mount portion of the base member and a stitch portion that is sewed with the thread. The holding member has the stitch portion closer to an outer peripheral end of the base member than the mount portion.

10 Claims, 4 Drawing Sheets

(56) References Cited

U.S. PATENT DOCUMENTS

| | | | |
|---|---|---|---|
| 2002/0125734 A1* | 9/2002 | Pokorzynski et al. | 296/146.7 |
| 2002/0153741 A1* | 10/2002 | Speelman et al. | 296/70 |
| 2005/0200161 A1* | 9/2005 | Reed et al. | 296/153 |
| 2006/0001291 A1* | 1/2006 | Dooley et al. | 296/153 |
| 2007/0236032 A1* | 10/2007 | Osada | 296/1.08 |
| 2007/0278809 A1* | 12/2007 | Reed et al. | 296/1.08 |
| 2008/0143132 A1* | 6/2008 | Okuda | 296/1.08 |
| 2008/0157432 A1* | 7/2008 | Boyer | 264/257 |
| 2008/0277955 A1* | 11/2008 | Sato | 296/1.08 |
| 2009/0127738 A1* | 5/2009 | Smith et al. | 264/254 |
| 2009/0295011 A1* | 12/2009 | Smith et al. | 264/101 |
| 2010/0171333 A1* | 7/2010 | Smith et al. | 296/1.08 |
| 2010/0279051 A1* | 11/2010 | Pokorzynski et al. | 428/43 |
| 2011/0139338 A1* | 6/2011 | Fox | 156/70 |
| 2013/0147228 A1* | 6/2013 | Filipp | 296/70 |
| 2014/0042767 A1* | 2/2014 | Filipp | 296/70 |
| 2014/0054914 A1* | 2/2014 | Teoh et al. | 296/1.08 |
| 2014/0167434 A1* | 6/2014 | Galarza | 296/1.08 |
| 2014/0306481 A1* | 10/2014 | Hinkokio et al. | 296/146.7 |
| 2014/0312641 A1* | 10/2014 | Davies | 296/1.08 |

* cited by examiner

DECORATION PART

CROSS REFERENCE TO RELATED APPLICATION

This application claims priority from Japanese Patent Application No. 2013-234770 filed Nov. 13, 2013. The entire contents of the priority application are incorporated herein by reference.

TECHNICAL FIELD

The present disclosure relates to a decoration part.

BACKGROUND

A decoration part includes a skin, a base member and a holding member (a sewing plate), for example. A stitch line is formed on a surface of the skin and the holding member is made of a synthetic resin and arranged between the skin and the base member. The skin and the holding member are sewed together with a stitching thread (a sewing thread) forming the stitch line and the holding member is fixed to the base member (a core member). Accordingly, the skin and the holding member are sewed together with the stitching thread more firmly and surely compared to a configuration in which only the skin is sewed with the stitching thread.

SUMMARY

An objective of the present technology is to provide a decoration part where a stitch line is formed much closer to an outer peripheral end of a decoration part.

A decoration part according to the present technology includes a base member having a front-side surface and an outer peripheral end portion including an outer peripheral end, a skin covering the front-side surface of the base member, and a holding member mounted to the front-side surface of the base member and arranged on a rear-surface side of the skin. The skin has a stitch line formed with a thread on a front-side surface of the skin, and a part of the stitch line is arranged in the outer peripheral end portion of the base member. The holding member holds the thread with which the skin and the holding member are sewed and having a linear shape extending along the stitch line, and the holding member has a mount portion that is mounted to a holding member mount portion of the base member and a stitch portion that is sewed with the thread. The holding member has the stitch portion closer to the outer peripheral end of the base member than the mount portion.

DETAILED DESCRIPTION

The stitch line is formed on various portions of the decoration part, and for example, the stitch line may be formed on an outer peripheral end portion of the decoration part. In such a case, the holder member is attached to the outer peripheral end portion of the base member.

However, it is harder to allocate a space necessary for the holding member in the outer peripheral end portion of the base member than in an inner portion of the base member, and it is troublesome to attach the holding member to the outer peripheral end portion of the base member. Therefore, to attach the holding member to the outer peripheral portion of the base member, the holding member is necessarily arranged in an inner portion of the base member that is on an inner side from an outer peripheral end of the base member. Therefore, it is difficult to form the stitch line near the outer peripheral end of the decoration part.

Figure 1:
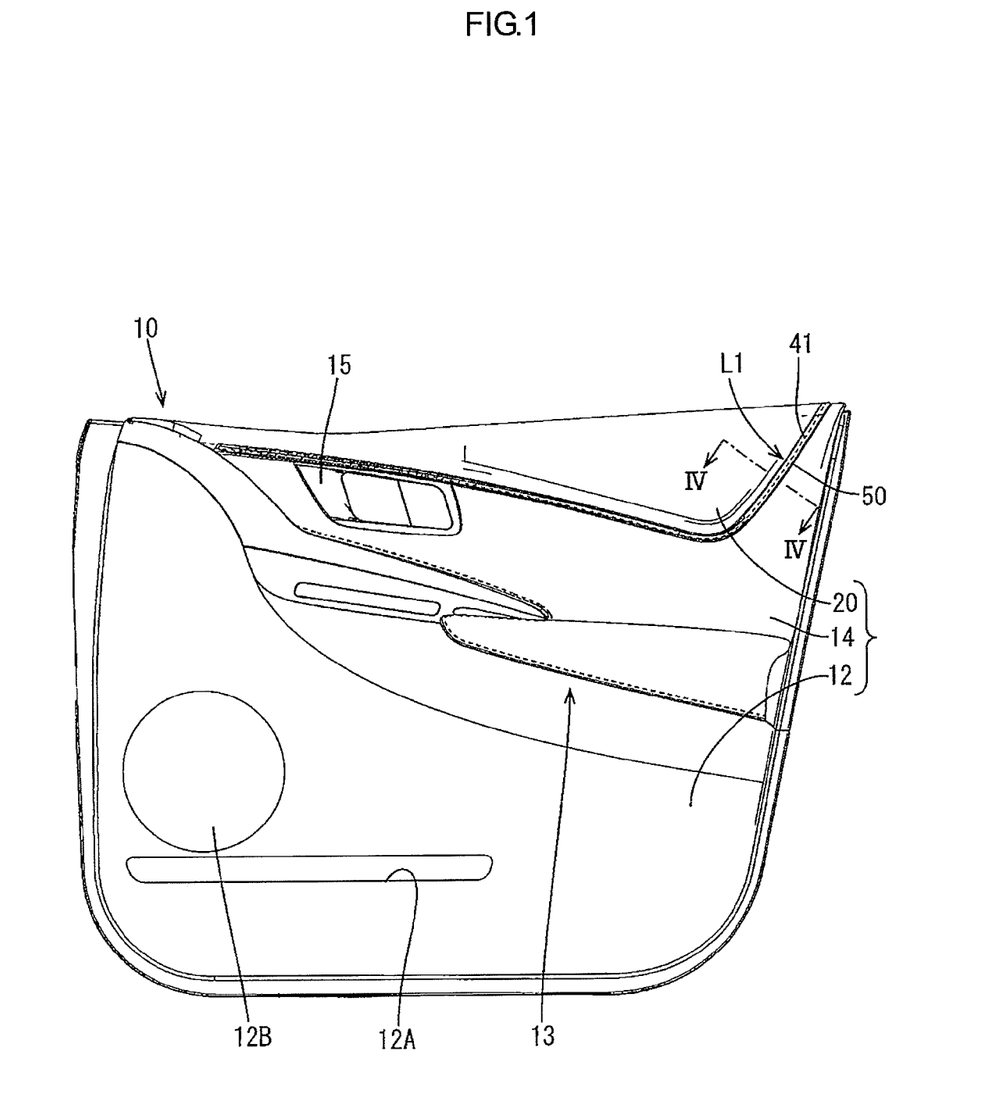
FIG. 1 is a front view illustrating a door trim including an upper board according to one embodiment of the present technology.

One embodiment of the present technology will be described with reference to FIGS. 1 to 4. FIG. 1 is a front view illustrating a vehicular door trim 10 including an upper board 10 (a decoration part) according to one embodiment of the present technology. The vehicular door trim 10 is mounted to a door inner panel (not illustrated) included in a door panel to constitute a part of a vehicular door.

As illustrated in FIG. 1, the vehicular door trim 10 includes a trim main body 11, and the trim main body 11 includes a lower board 12, an ornament 14, and an upper board 20.

Each of the lower board 12 and the ornament 14 is a plate-like member that is made of a synthetic resin material such as polypropylene. A material of the members of the trim main body 11 is not necessarily a synthetic resin material but may be a mixture of a plant fiber (for example, kenaf, sun hemp, flux, sisal) and a synthetic resin.

The lower board 12 constitutes a lower part of the trim main body 11. The lower board 12 includes a door pocket opening 12A for a door pocket and a speaker grill 12B.

An armrest 13 is provided at a border between the lower board 13 and the ornament 14. The armrest 13 has an elongated shape extending in a vehicular front-and-rear direction and projects toward a vehicular interior side.

Figure 4:
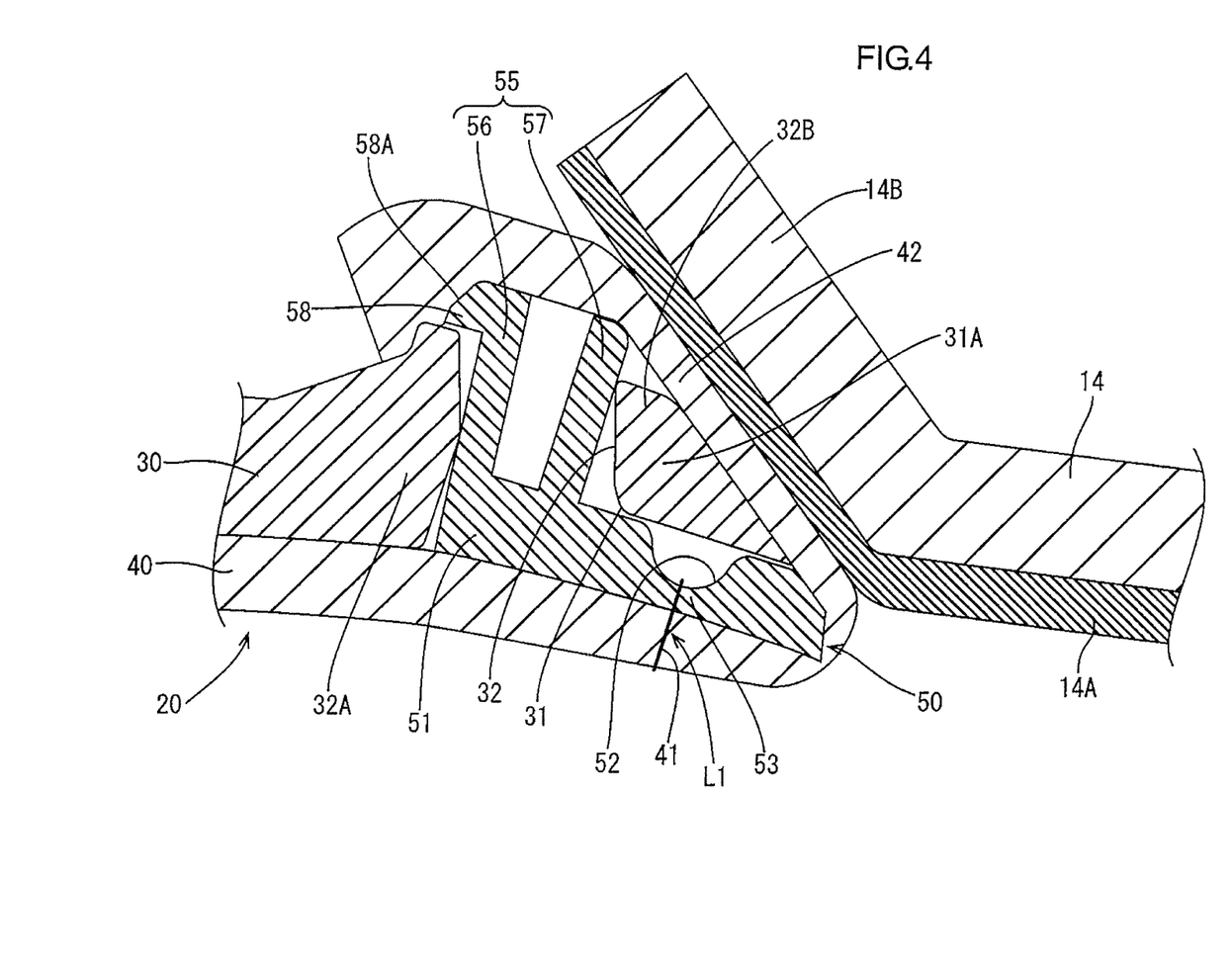
FIG. 4 is a cross sectional view of the holding member in FIG. 3 and its surroundings (taken along line IV-IV in FIG. 1).

As illustrated in FIG. 1, the ornament 14 has an elongated shape extending in the vehicular front-and-rear direction. The ornament 14 has an upper end portion that is recessed downwardly at a vehicular rear-side portion. The ornament 14 includes an inside handle mount portion 15 at its vehicular front-end portion to mount an inside handle (not illustrated) therein. As illustrated in FIG. 4, a skin 14A is adhered to a vehicular interior side surface of the ornament 14.

As illustrated in FIG. 1, the upper board 20 has an elongated shape extending in the vehicular front-and-rear direction. The upper board 20 has a lower end portion that protrudes downwardly at its vehicular rear-side portion. The upper board 20 is mounted to the ornament 14 with fastening means such as screws or thermal caulking such that the lower end portion of the upper board 20 and the upper end portion of the ornament 14 are connected each other. The lower end portion of the upper board 20 extends along the upper end portion of the ornament 14.

As illustrated in FIG. 4, the upper board 20 includes a plate-like base member 30, a skin 40, and a holding member 50. The base member 30 is made of a synthetic resin such as polypropylene. The skin 40 covers a front-side surface (a vehicular interior side surface, a design surface, a lower side surface in FIG. 4) of the base member 30. The holding member 50 is attached to the lower end portion of the base member 30. The holding member 50 is attached to a portion of the base member 30 where the upper board 20 is mounted to the ornament 14.

A material of the base member 30 is not necessarily a synthetic resin material but may be a mixture of a plant fiber (for example, kenaf, sun hemp, flux, sisal) and a synthetic resin.

As is represented with a dashed line in FIG. 1, a stitch line L1 made with a stitching thread 41 is formed on a surface of the skin 40. The stitch line L1 extends over an entire length of the lower end portion of the upper board 20, that is, an entire length of the lower end portion of the base member 30.

The holding member 50 holds the stitching thread 41 to the skin 40. The holding member 50 is made of a synthetic resin such as polypropylene and has a linear shape extending along the stitch line L1. Namely, the holding member 50 extends along the lower end portion of the upper board 20 or the lower end portion of the base member 30. The holding member 50 is attached to a front-side surface of the base member 30 and arranged on a rear-side surface of the skin 40.

As illustrated in FIGS. 1 to 4, the holding member 50 includes a holding member main body 51 and mount projections 55. The holding member main body 51 extends along the lower end portion of the base member 30. Each of the mount projections 55 projects from a rear-side surface (a vehicular exterior side surface) of the holding member main body 51. The holding member main body 51 is arranged at an outer peripheral end portion of the base member 30 and between the front-side surface of the base member 30 and the rear-side surface of the skin 40. The mount projection 55 is inserted through a through hole 32 formed in the base member 30.

Figure 2:
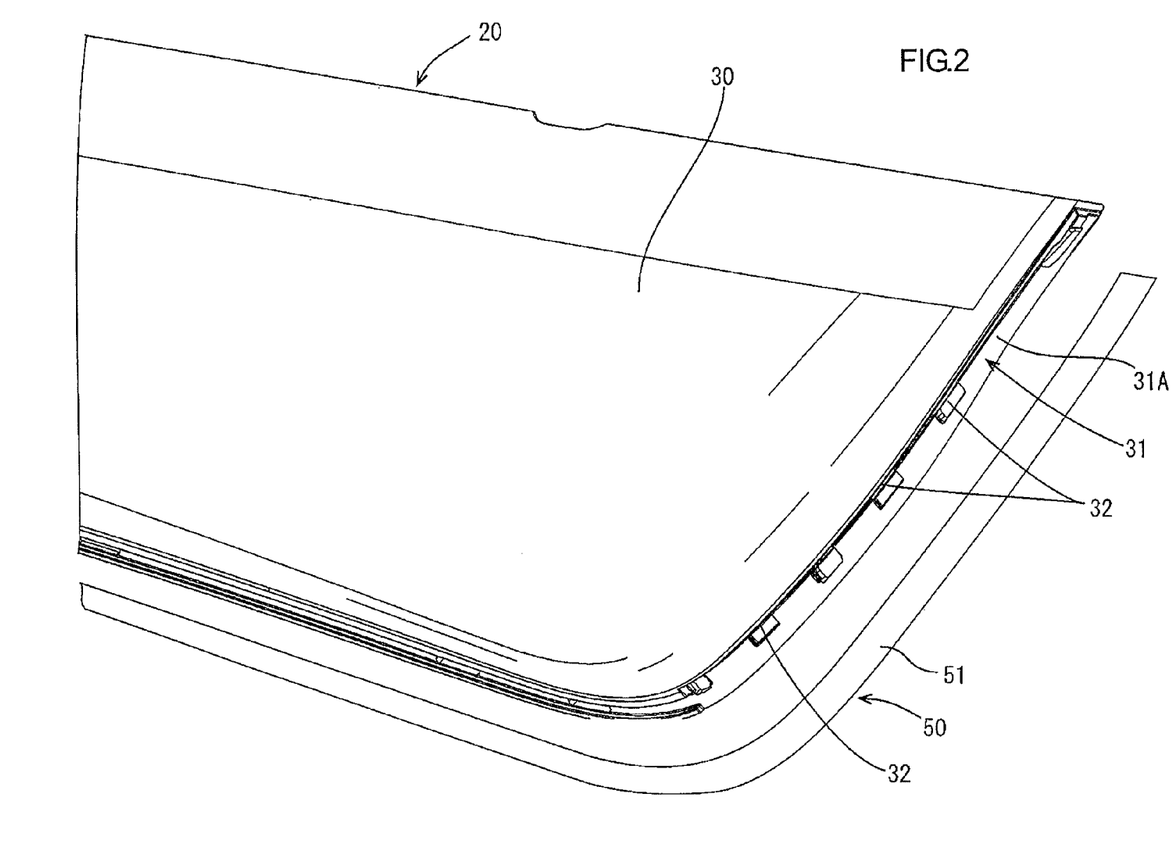
FIG. 2 is an exploded perspective view illustrating the upper board in FIG. 1 and a holding member.

As illustrated in FIGS. 2 and 4, the base member 30 includes a recessed portion 31 on its front-side surface of the lower end portion (the outer peripheral end portion). The base member 30 has a thickness that is smaller in the recessed portion 31 than in its middle portion (an inner portion that is located on an inner side from the outer peripheral end portion of the base member 30). The recessed portion 31 extends over an entire length of the lower end portion of the base member 30. The holding member main body 51 is fitted to the front-side surface of the recessed portion 31 such that the front-side surface of an inner portion of the base member 30 that is located on an inner side than the recessed portion 31 and the front-side surface of the holding member main body 51 are in the same plane, as illustrated in FIG. 4. Namely, in FIG. 4, a lower surface of the base member 30 and a lower surface of the holding member main body 51 form a smooth surface.

The base member 30 includes an end wall portion 31A (the outer peripheral end portion) where the recessed portion 31 is formed. The end wall portion 31A has a thickness smaller than the inner portion that is on an inner side of the base member 30 than the end wall portion 31A. The end wall portion 31A has a rear-side surface or a vehicular exterior surface that is inclined such that a thickness of the base member 30 gradually decreases as is closer to the outer peripheral end, and the end wall portion 31A has the recessed portion 31 on its front-side surface or its vehicular interior side. As illustrated in FIG. 4, a plurality of through holes 32 (a holding member mount portion, a fitting portion) are formed through the end wall portion 31A that corresponds to the outer peripheral end portion of the base member 30 and arranged along the outer peripheral portion of the base member 30. As illustrated in FIG. 2, each of the through holes 32 has a substantially rectangular plan view shape. The mount projection 55 of the holding member 50 projects from the holding member main body 51 toward the base member 30 and is inserted through the through hole 32 from the front-side surface of the base member 30 (from a lower side in FIG. 4).

Figure 3:
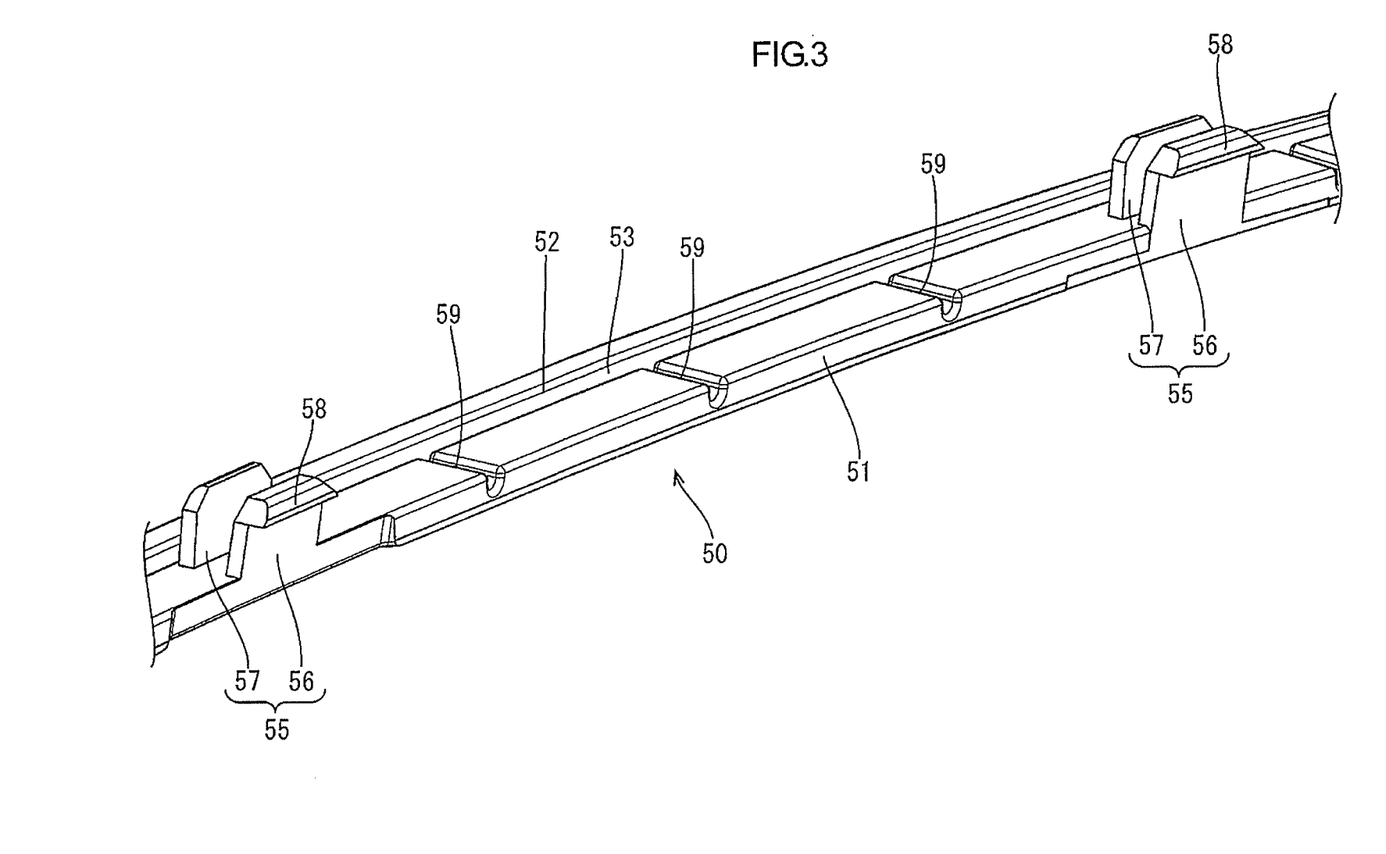
FIG. 3 is a perspective view illustrating the holding member in FIG. 2 seen from a rear-side surface.

As illustrated in FIG. 3, a plurality of mount projections 55 (a mount portion) are arranged along an elongated direction of the holding member 50. As illustrated in FIGS. 3 and 4, each of the mount projections 55 includes a pair of projection pieces 56, 57 that projects from the rear-side surface of the holding member main body 51 toward the base member 30. As illustrated in FIG. 3, pairs of projection pieces 56, 57 are arranged along the elongated direction of the holding member 50.

The pair of projection pieces includes an inner projection piece 56 and an outer projection piece 57. The outer projection piece 57 is arranged near an outer peripheral end of the base member 30. The inner projection piece 56 is arranged on a relatively inner side with respect to the base member 30, that is, the inner projection piece 56 is arranged farther from the outer peripheral end of the base member 30 than the outer projection piece 57. The inner projection piece 56 projects from an inner-side end of the holding member main body 51 with respect to the base member 30. The inner projection piece 56 has a stopper portion 58 at its distal end. The stopper portion 58 is stopped by a hole edge portion of the through hole 32 that is a part of the rear-side surface of the base member 30. The stopper portion 58 projects from a distal end of the inner projection piece 56 toward the inner portion or the middle portion of the base member 30.

As illustrated in FIG. 4, the through hole 32 is formed in a portion of the end wall portion 31A corresponding to an inner end portion of the recessed portion 31. The hole edge portion of the through hole 32 includes an inner hole edge portion 32A (an inner hole edge portion) and an outer hole edge portion 32B (an outer hole edge portion). The inner hole edge portion 32A is included in a relatively inner portion of the base member 30 (on the left side of the through hole 32 in FIG. 4), and the outer hole edge portion 32B is included in a relatively outer portion of the base member 30 (in a portion near the outer peripheral end of the base member or in the right side portion of the through hole 32 in FIG. 4). The inner hole edge portion 32A has a plate thickness greater than the outer hole edge portion 32B. Namely, the stopper portion 58 is stopped by the inner hole edge portion 32A that has a greater plate thickness (greater rigidity) among the hole edge portions of the through hole 32.

The inner projection piece 56 and the outer projection piece 57 are arranged in a width direction (a right-and-left direction in FIG. 4) of the holding member main body 51 to face each other with a space therebetween. Each of the inner projection piece 56 and the outer projection piece 57 is elastically deformable so that its distal end moves with its basal end as a supporting point. The stopper portion 58 has a vehicular exterior side surface that is an inclined surface 58A. The inclined surface 58A is inclined such that a degree of projection of the stopper portion 58 from the inner projection piece 56 increases as is away from the distal end of the inner projection piece 56.

With such a configuration, when inserting the inner projection piece 56 and the outer projection piece 57 through the through hole 32, an operator puts the inclined surface 58A of the stopper portion 58 to be in contact with the inner hole edge portion 32A and inserts the inner projection piece 56 and the outer projection piece 57 into the through hole 32. Then, the distal end of the inner projection piece 56 is deformed to approach the outer projection piece 57.

Accordingly, a distance between the stopper portion 58 and the outer projection piece 57 in the width direction of the holding member main body 51 becomes smaller than a size of the through hole 32 in the width direction so that the inner projection piece 56 and the outer projection piece 57 can be inserted through the through hole 32. When the stopper portion 58 reaches the rear-side surface of the base member 30 while the inner projection piece 56 and the outer projection piece 57 being inserted through the through hole 32, the inner projection piece 56 elastically recovers. Accordingly, the stopper portion 58 is stopped by the inner hole edge portion 32A of the through hole 32.

The inner projection piece 56 includes the stopper portion 58 and the inner projection piece 56 elastically recovers. With such a configuration, an operator can effectively feel good fitting when the inner projection piece 56 elastically recovers. Accordingly, the operator confirms that the inner projection piece 56 and the outer projection piece 57 are surely mounted on the base member 30.

When the inner projection piece 56 and the outer projection piece 57 are inserted through the through hole 32, the inner projection piece 56 and the outer projection piece 57 are deformed to approach each other, and this may reduce the distance between the inner projection piece 56 and the outer projection piece 57.

The skin 40 includes a peripheral end portion (a part of the skin) that is a folded portion 42 extending from a portion covering the front-side surface of the base member 30 (a skin main body) and being folded at an outer peripheral end of the holding member main body 51 toward the rear-side surface of the base member 30.

Distal end portions of the inner projection piece 56 and the outer projection piece 57 that are inserted through the through hole 32 and project to the rear-side surface of the base member 30 are covered with the folded portion 42 from the rear-side surface (the upper side in FIG. 4). The skin 40 is adhered to the base member 30 and the distal end portions of the inner projection piece 56 and the outer projection piece 57 with adhesive, for example.

As illustrated in FIG. 4, the holding member main body 51 has a recess 52 on its rear-side surface. As illustrated in FIG. 3, the recess 52 extends along the elongated direction of the holding member main body 51.

With such a recess 52, the portion of the holding member main body 51 where the recess 52 is formed has a thickness smaller than other portions of the holding member main body 51. A bottom wall portion of the recess 52 that is a part of the holding member main body 51 is a stitch portion 53 that is sewed with the stitching thread 41. The stitch portion 53 is located closer to the outer peripheral end of the base member 30 than the mount projection 55 (on the right side of the mount projection 55 in FIG. 4). The stitch portion 53 has a thickness smaller than its surrounding portions and therefore, the stitch portion 53 is easily sewed with the stitching thread 41.

The stitch portion 53 and the skin 40 are sewed together with the stitching thread 41. Therefore, a position of the stitching thread 41 is less likely to be shifted. Further, the holding member 50 including the stitch portion 53 is firmly fitted to the base member 30 via the through hole 32 and the mount projection 55. Therefore, the stitching thread 41 is surely held to the base member 30.

The stitching thread 41 has a base member 30 side end portion that is arranged in the recess 52. Therefore, the base member 30 and the stitching thread 41 provided in the stitch portion 53 have a space therebetween and the stitching thread 41 does not come in contact with the base member 30 and the stitching thread 41 is less likely to be loosened. Accordingly, and the skin 40 is less likely to be separated from the base member 30.

As illustrated in FIG. 4, the recess 52 has a curved bottom surface and the stitching thread 41 is formed at a most recessed portion of the curved surface of the recess 52. Therefore, at the time of sewing, the position of the stitching thread 41 in the recess 52 is easily determined and the position of the stitching thread 41 is less likely to be shifted.

According to this embodiment, after the stitch portion 53 and the skin 40 are sewed together with the stitching thread 41, each of the mount projections 55 of the holding member 50 is inserted through the corresponding through hole 32. Then, the folded portion 42 of the skin 40 is folded to be on the rear-side surface of the base member 30 and the folded portion 42 is adhered to the rear-side surfaces of the mount projections 55 and the base member 30.

As illustrated in FIG. 3, the holding member main body 51 has grooves 59 on its rear-side surface each extending along a short-side direction of the holding member main body 51. The grooves 59 are arranged in a longitudinal direction (the elongated direction) of the holding member main body 51. With such grooves 59, the holding member main body 51 is easily bent or deforms in the longitudinal direction. Accordingly, the holding member main body 51 is easily arranged along the front-side surface of the curved base member 30.

As illustrated in FIG. 4, the ornament 14 has an upper end portion 14B that is a peripheral end portion adjacent to the upper board 20. The ornament 14 is bent at an end portion thereof to form the upper end portion 14B that is inclined such that its upper distal end is on the vehicular exterior side than its lower basal end. The upper end portion 14B of the ornament 14 is located on the vehicular exterior side than the lower end portion of the upper board 20 (the outer peripheral end portion of the upper board 20 adjacent to the ornament 14).

The rear-side surface of the lower end portion of the upper board 20 (the peripheral end portion of the upper board 20 adjacent to the ornament 14) is an inclined surface that follows an inclined surface of the upper end portion 14B of the ornament 14. Namely, the lower end portion of the upper board 20 has a thickness that decreases as is closer to a main body of the ornament 14.

Next, advantageous effects of the present embodiment will be described. According to the present embodiment, the stitch portion 53 is located closer to the outer peripheral end of the base member 30 than the mount projection 55. Therefore, compared to a configuration that the mount projection and the stitch portion are not shifted from each other and overlap each other in the inner-and-outer direction of the base member 30, the stitching thread 41 in the stitch portion 53 (eventually the stitch line L1) can be arranged much closer to the outer peripheral end of the upper board 20.

The holding member 50 includes the holding member main body 51 that extends along the stitch line L1 and the mount projections 55 projecting from the rear-side surface of the holding member main body 51 toward the base member 30 is fitted through the respective through holes 32.

The mount projections 55 fitted through the respective through holes 32 fix the holding member 50 to the base member 30. According to the present embodiment, the stitch portion 53 is located closer to the outer peripheral end of the base member 30 than the mount projections 55. Therefore, the stitching thread 41 in the stitch portion 53 and the mount projections 55 are not in contact with each other.

An end part of the skin 40 is the folded portion 42 that is located on a rear-surface side of the base member 30. After the mount projections 55 are inserted through the respective through holes 32, the distal end portions of the mount projections 55 are located on an outer side than the rear-side surface of the base member 30. The distal end portions of the mount projections 55 are covered with the folded portion 42.

The skin 40 covering the distal end portions of the mount projections 55 protects the mount projections 55. For example, even if the distal end portions of the mount projections 55 that are protected by the skin 40 are pressed, they are less likely to be deformed and the mount projections 55 are less likely to be dropped off from the respective through holes 32. The mount projections 55 are protected by the folded portion 42 and the holding member 50 is sandwiched and held between the folded portion 42 and the skin main body that is provided on the front-side surface of the base member 30. Accordingly, the mount projection 55 is less likely to be dropped off from the through hole 32.

Each mount projection 55 includes a pair of projection pieces 56, 57 that project from the rear-side surface of the holding member main body 51 toward the base member 30. Among the inner projection piece 56 and the outer projection piece 57, the inner projection piece 56 that is arranged in an inner portion or a middle portion of the base member 30 with respect to the outer projection piece 57 includes the stopper portion 58 at its distal end portion. The stopper portion 58 is stopped by the inner hole edge portion 32A of the through hole 32 from the rear-side surface of the base member 30. Among the hole edge portions of the through hole 32, the inner hole edge portion 32A that is included in a relatively inner portion or a middle of the base member 30 has a plate thickness greater than the outer hole edge portion 32B that is included in a relatively outer portion of the base member 30 that is near the outer peripheral end of the base member 30.

In the base member 30 having the through hole 32 near the outer peripheral end thereof, it is difficult to allocate a space for a part that fits to the stopper portion 58 (a stopper portion fitting portion) in a portion of the base member 30 that is on an outer side or closer to the outer peripheral end than the through hole 32.

Especially, according to the present embodiment, the plate thickness of the outer peripheral portion (the lower end portion) of the base member 30 reduces as is closer to the outer peripheral end, and this makes more difficult to fit the stopper portion 58 to a part of the base member 30 that is located on an outer side than the through hole 32.

The outer peripheral end of the base member 30 is a border between the ornament 14 and the base member 30. Therefore, if the stopper portion 58 is provided on the outer projection piece 57 that is located closer to the ornament 14 than the inner projection piece 56, the stopper portion 58 projects toward the ornament 14 and this may cause contact between the stopper portion 58 and the ornament 14. Therefore, according to the present embodiment, among the inner projection piece 56 and the outer projection piece 57, the outer projection piece 57 that is located relatively on an outer side with respect to the base member 30 than the inner projection piece 56 does not have the stopper portion 58 and only the inner projection piece 56 that is located on an inner side with respect to the base member 30 has the stopper portion 58.

With the configuration that only the inner projection piece 56 has the stopper portion 58, the fitting force of the stopper portion 58 to the base member 30 is lowered compared to the configuration that each of the inner projection piece 56 and the outer projection piece 57 has the stopper portion 58. However, according to the present embodiment, the distal end portions of the mount projections 55 are covered with the folded portion 42. With such a configuration, the mount projections 55 are protected by the folded portion 42 and the mount projections 55 are sandwiched and held between the skin 40 and the folded portion 42. Accordingly, the mount projections 55 are less likely to be dropped off from the through holes 32.

Among the hole edge portions of the through hole 32, the inner hole edge portion 32A included in a relatively inner portion of the base member 30 has a plate thickness greater than the outer hole edge portion 32B included in a relatively outer portion of the base member 30. With this configuration, the stopper portion 58 is stopped by the inner hole edge portion 32A that has a greater plate thickness and greater rigidity among the hole edge portions of the through hole 32. Therefore, the stopper portion 58 is stopped by the hole edge portion of the through hole 32 surely and firmly.

With the configuration that the stopper portion 58 is provided on only one of the inner projection piece 56 and the outer projection piece 57, the configuration is simplified and the holding member 50 is easily and effectively molded compared to the configuration that the stopper portion 58 is provided on both of the inner projection piece 56 and the outer projection piece 57. For example, if the holding member 50 is molded with injection molding, the stopper portion 58 is likely to be a part of an undercut. Therefore, the holding member 50 is easier to be molded with a smaller number of the stopper projections 58.

The inner projection piece 56 and the outer projection piece 57 can be deformed or warped with a smaller deformation degree to be inserted through the through hole 32 with the configuration that only one of the inner projection piece 56 and the outer projection piece 57 has the stopper portion 58 compared to the configuration that each of the inner projection piece 56 and the outer projection piece 57 has the stopper portion 58. Therefore, an operator can insert the inner projection piece 56 and the outer projection piece 57 through the through hole 32 with a smaller force and this improves workability.

The holding member 50 extends along the outer peripheral end of the base member 30 and the mount projections 55 are disposed along the elongated direction of the holding member 50.

With such a configuration, the stitch line L1 is formed along the outer peripheral edge of the base member 30.

<Other Embodiments>

The present technology is not limited to the description as described above with reference to the drawings. For example, the present technology may include following embodiments.

(1) In the above embodiment, the upper board 20 constituting a part of the vehicular door trim 10 (an example of the vehicular interior part) is used as the decoration part. However, it is not limited thereto. The present technology can be applied to any decoration parts having a stitch line. For example, the present technology may be applied to a decoration part constituting a part of an instrumental panel or a pillar garnish. The decoration part is not necessarily used for a vehicle but may be used for others. For example, the decoration part may be used for furniture.

(2) In the above embodiment, another member (such as a soft material) may be provided between the base member 30 and the skin 40.

(3) In the above embodiment, the through hole 32 is provided as the holding member mount portion and the inner projection piece 56 and the outer projection piece 57 are provided as the mount portion. However, it is not limited thereto. For example, a mount boss that can be inserted through the through hole 32 may be used as the mount portion. The holding member mount portion is not limited to the through hole 32 but may be a fitting recess where the inner projection piece 56 and the outer projection piece 57 can be fitted.

(4) In the above embodiment, the number of the mount projections 55 and that of the through holes 32 may be altered, if necessary. For example, the mount projection 55 and the through hole 32 may be one.

(5) In the above embodiment, the holding member 50 and the stitch line L1 extend along the outer peripheral edge of the base member 30. However, it is not limited thereto. At least a part of the holding member 50 and the stitch line L1 may be disposed on the outer peripheral end portion of the base member 30.

(6) In the above embodiment, the recess 52 where the stitching thread 41 is disposed is included in the holding member 50. However, it is not limited thereto. The recess may be formed on the base member 30 and the holding member 50 does not include the recess 52. With such a configuration, the stitching thread 41 provided in the holding member 50 is not in contact with the base member 30.

The invention claimed is:

1. A decoration part comprising:
a base member having a front-side surface and an outer peripheral end portion including an outer peripheral end;
a skin covering the front-side surface of the base member and having a stitch line formed with a thread on a front-side surface of the skin, a part of the stitch line being arranged in the outer peripheral end portion of the base member; and
a holding member mounted to the front-side surface of the base member and arranged on a rear-surface side of the skin, the holding member holding the thread with which the skin and the holding member are sewed and having a linear shape extending along the stitch line, the holding member having a mount portion that is mounted to a holding member mount portion of the base member and a stitch portion that is sewed with the thread, the holding member having the stitch portion closer to the outer peripheral end of the base member than the mount portion.

2. The decoration part according to claim 1, wherein the holding member further includes:
a holding member main body extending along the stitch line and including the stitch portion, and
a mount projection that is the mount portion and projects from a rear-side surface of the holding member main body toward the base member, the mount projection being fitted to the holding member mount portion of the base member.

3. The decoration part according to claim 2, wherein the holding member mount portion is a through hole formed through the base member,
the skin includes a folded portion that is disposed on a side of a rear-side surface of the base member that is opposite to the front-side surface thereof,
the mount projection extends through the through hole and a distal end portion thereof projects to the rear-side surface of the base member, and
the distal end portion of the mount projection is covered with the folded portion.

4. The decoration part according to claim 3, wherein the mount projection includes projection pieces each of which projects from the rear-side surface of the holding member main body toward the base member and the projection pieces include an outer projection piece located near the outer peripheral end of the base member and an inner projection piece located farther from the outer peripheral end than the outer projection piece,
the base member has a hole edge portion around the through hole and the hole edge portion includes an outer hole edge portion that is located near the outer peripheral end and an inner hole edge portion that is located farther from the outer peripheral end than the outer hole edge portion,
the inner hole edge portion has a thickness greater than the outer hole edge portion, and
the inner projection piece has a stopper portion at its distal end portion, and the stopper portion is stopped by the inner hole edge portion from the rear-side surface of the base member.

5. The decoration part according to claim 1, wherein the holding member extends along the outer peripheral end portion, and
the mount portion includes a plurality of mount portions that are arranged in an extending direction in which the holding member extends.

6. The decoration part according to claim 3, wherein the skin disposed on the front-side surface of the base member and the folded portion sandwich the holding member that is mounted to the base member via the mount projection and the through hole, and the skin disposed on the front-side surface of the base member and the folded portion sandwich the holding member from the front-side surface and the rear-side surface of the base member.

7. The decoration part according to claim 1, wherein the outer peripheral end portion of the base member has a thickness smaller at the outer peripheral end of the base member than at a portion away from the outer peripheral end.

8. The decoration part according to claim 4, wherein the inner projection piece projects from an inner-side end of the holding member main body with respect to the base member.

9. The decoration part according to claim 1, wherein the stitch portion has a recess, and
the base member and the thread provided in the stitch portion have a space therebetween.

10. The decoration part according to claim 2, wherein the base member has a recessed portion on the front-side surface of the outer peripheral end portion thereof,
the holding member main body is fitted in the recessed portion, and
the front-side surface of the base member and the front-side surface of the holding member main body are in a same plane.

* * * * *